US011738278B2

(12) United States Patent
Thompson et al.

(10) Patent No.: US 11,738,278 B2

(45) Date of Patent: Aug. 29, 2023

(54) CHAIN ASSEMBLY COATING

(71) Applicant: Frustration Free Solutions, LLC, Twin Falls, ID (US)

(72) Inventors: Nathan Thompson, Twin Falls, ID (US); Jimmy Morrison, Springville, UT (US)

(73) Assignee: Frustration Free Solutions, LLC, Twin Falls, ID (US)

(*) Notice: Subject to any disclaimer, the term of this patent is extended or adjusted under 35 U.S.C. 154(b) by 395 days.

(21) Appl. No.: 16/844,239

(22) Filed: Apr. 9, 2020

(65) Prior Publication Data

US 2020/0324211 A1 Oct. 15, 2020

Related U.S. Application Data

(60) Provisional application No. 62/832,006, filed on Apr. 10, 2019.

(51) Int. Cl.

| | |
|---|---|
| ***A63G 9/12*** | (2006.01) |
| ***F16G 15/12*** | (2006.01) |
| ***C09D 157/00*** | (2006.01) |
| ***F16G 17/00*** | (2006.01) |

(52) U.S. Cl.

CPC ............. *A63G 9/12* (2013.01); *C09D 157/00* (2013.01); *F16G 15/12* (2013.01); *F16G 17/00* (2013.01)

(58) Field of Classification Search

CPC ... A63G 9/00; A63G 9/02; A63G 9/12; A63G 13/08

USPC .................................................. 472/118–125

See application file for complete search history.

(56) References Cited

U.S. PATENT DOCUMENTS

| | | | | |
|---|---|---|---|---|
| 2006/0061166 A1* | 3/2006 | Bolland | A63G 9/00 | 297/281 |
| 2010/0113235 A1* | 5/2010 | Calvagne | A63B 7/02 | 482/143 |
| 2012/0298825 A1* | 11/2012 | Fisher | F16M 13/027 | 248/323 |
| 2014/0252826 A1* | 9/2014 | Smith | A63G 9/00 | 297/250.1 |

* cited by examiner

*Primary Examiner* — Kien T Nguyen

(74) *Attorney, Agent, or Firm* — Dentons Durham Jones Pinegar

(57) ABSTRACT

The system may be a process and a device that allows for safety in swinging on a swing at a park, playground or swing set. The process may include fixing a chain, hook/connector and an anchor into a single chain assembly. The chain assembly may be dipped or submerged in a polymer coating and allowed to dry, forming a continuous coating over the chain assembly. The chain assembly may be secured to a swing seat using brackets to engage the anchor portion of the chain assembly. The polymer coating may partially or entirely coat the chain assembly while still allowing manipulation and deformation of the chain assembly. The polymer coating may provide easier gripping and safer swinging.

20 Claims, 6 Drawing Sheets

10 10 14 14 18 32 26 26 18 34 34 36

CHAIN ASSEMBLY COATING

PRIORITY CLAIM

This application claims priority to U.S. provisional application No. 62/832,006, filed Apr. 10, 2019, the disclosure of which is hereby incorporated by reference in its entirety.

TECHNICAL FIELD

This disclosure relates generally to a chain assembly for swings. More specifically, this disclosure relates to a coating for bucket swings and other swing seats and specifically a coating for the entire chain assembly of the swing to provide an improved user experience and increased safety. The coating may provide safe connection of multiple facets of a chain while limiting the risk of pinching and allow for easier gripping of the swing chain.

BACKGROUND

Swings on playgrounds and swing sets have been around and used for decades. Many of these swings utilize a chain or chain assembly to attach the seat of the swing to the support structure. The most common swing set configuration employed on both public and private playgrounds involves an A-frame construction having two A-frame vertical supports attached at their apex by an elongated horizontal bar from which are suspended one or a plurality of swings or other pieces of equipment. The swings and other pieces of equipment are often attached to the vertical support by a chain.

Bucket swings have been utilized for smaller children and infants to swing, and typically use a chain or assembly to attach the bucket swing to the support structure. Belt swing seats have likewise been utilized for all ages to swing while typically using a chain or assembly to attach the belt swing to the support structure. More recently chains have been going through a process of coating the chain in a rubber to allow for easier gripping and for safety with utilizing a chain for swinging. Previously, chains had also been encased in a plastic chain sleeve to improve gripping and safety.

Too often the chains in swings can cause harm or injury because the chain is too slippery, too hot, or does not provide adequate safety from pinching and pulling for fingers, hands, hair or other appendages being caught between chain links and other parts of the assembly. While coating and/or covering (such as a plastic sheath) is sometimes utilized for the chain itself, the entire chain assembly still poses injury risks.

Many of the current devices coat or cover only the chain or a portion of the chain. This allows the chain to be interchangeable among various types of playground equipment. For example, known coated chains may be connected to bucket swing, and then the bucket swing could be removed and a classic swing seat could be attached. While this may provide for interchangeability of playground equipment while using the same chain, it does not minimize injury while using the equipment and still exposes junctions where fingers, hair, etc. could be caught and injured. The following description provides the ability to overcome the shortcomings of current devices.

SUMMARY

The present disclosure relates to a swing system, and according to one aspect, the swing system may comprise: a swing chain assembly with a chain having a plurality of links secured to a connector; an anchor secured to the connector; and each of the chain, the connector, and the anchor at least partially covered with a deformable polymer.

According to another aspect, the swing system may comprise a seat having a first side and a second side opposite the first side; and a first bracket secured to the first side of the seat and a second bracket secured to the second side of the seat.

The system may further comprises a second swing chain assembly, the anchor of the swing chain assembly secured to the first bracket and the anchor of the second swing chain assembly secured to the second bracket.

According to another aspect, the connector may be an S-shaped hook, and the plurality of links of the chain may include a proximal link, the proximal link of the chain secured to a first side of the S-shaped hook and the anchor secured to a second end of the S-shaped hook. The anchor may comprise an isosceles triangle. In some configurations, the S-shaped hook may be stamped closed after it is connected to the proximal link and/or the anchor.

According to yet another aspect, various amounts of the swing chain assembly may be coated in the deformable polymer. For example, the swing chain assembly may be entirely covered with the deformable polymer. The anchor and the connector may be entirely covered with the deformable polymer and a portion of the chain may be covered with the deformable polymer. The chain secured to the connector may define a chain-connector junction, and the anchor secured to the connector may define an anchor-connector junction, the deformable polymer surrounding the chain-connector junction and the anchor-connector junction. The chain, the connector and the anchor may be surrounded by a contiguous coating of synthetic plastic polymer.

According to another aspect, a swing system may include a swing chain assembly comprising: a chain comprising a plurality of links, including a proximal link; an anchor; a connector secured to the proximal link and the anchor; and a contiguous coating of synthetic plastic polymer covering at least a portion of the chain, the entire connector, and the entire anchor. The connector secured to the proximal link may define a chain-connector junction, the connector secured to the anchor may define an anchor-connector junction, with the contiguous coating of synthetic plastic polymer surrounding the chain-connector junction and the anchor-connector junction.

According to another aspect, the swing system further comprises a bracket attachable to the anchor and a swing seat. In some configurations, the anchor comprises a triangle, such as an isosceles triangle.

According to yet another aspect, a method of making a swing system is disclosed, the method comprising: selecting a chain comprising a plurality of links extending from a proximal end to a distal end; selecting a connector; selecting an anchor; attaching the connector to the chain and the anchor; the chain, connector, and anchor forming a swing chain assembly; and dipping the swing chain assembly at least partially into a polymer gel.

In some configurations, the method may further comprise the step of mounting the swing chain assembly onto a dipping mechanism by attaching the distal end of the chain to the dipping mechanism, the proximal end of the chain attached to the connector. The step of dipping the swing chain assembly at least partially into the polymer gel may comprise dipping the anchor of the swing chain assembly first, followed by the connector and at least a portion of the chain. In some configurations, the step of dipping the swing chain assembly at least partially into the polymer gel may comprise dipping the anchor, the connector, and at least part of the chain. According to one aspect, the connector may comprise an S-hook having a first side and a second side, the step of attaching the connector to the chain comprising attaching the proximal end of the chain to the first side of the S-hook and stamping the first side of the S-hook closed. The step of attaching the connector to the anchor may comprise attaching the anchor to the second side of the S-hook and stamping the second side of the S-hook closed.

DESCRIPTION

The following description sets forth the process and system of a chain assembly coating to provide safe swinging. While the following disclosure relates generally to swings and swinging, as typically used on playgrounds and swing sets, the process and system may have further utility outside the specific usage on swings and those other applications are contemplated herein.

A coating as used herein is described as a "deformable polymer" or "synthetic plastic polymer," and may simply be referred to as "a coating." These terms may be used interchangeably and may refer to any type of suitable polymer/plastic coating, such as a plastisol or any other known synthetic polymer. Plastisol is a suspension of PVC and/or other known polymer particles in a liquid plasticizer. Plastisol flows as a liquid and can be poured into a heated mold. When heated to around 177 degrees Celsius, the plastic particles dissolve and the mixture turns into a gel of high viscosity that usually cannot be poured anymore. On cooling below 60 degrees Celsius, a flexible, permanently plasticized solid product results. Plastisol is commonly used as a coating, particularly in outdoor applications and dip-coating. It will be appreciated that plastisol may be used, and any other suitable polymer may similarly be used to achieve a coating as described herein.

Figure 1:
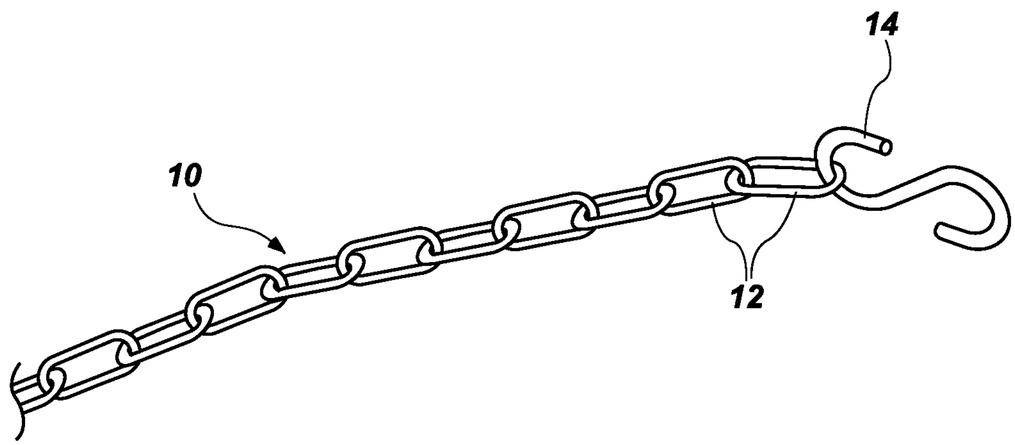
FIG. 1 illustrates a portion of a chain assembly with a chain with a plurality of links and an S-hook.
Figure 2:
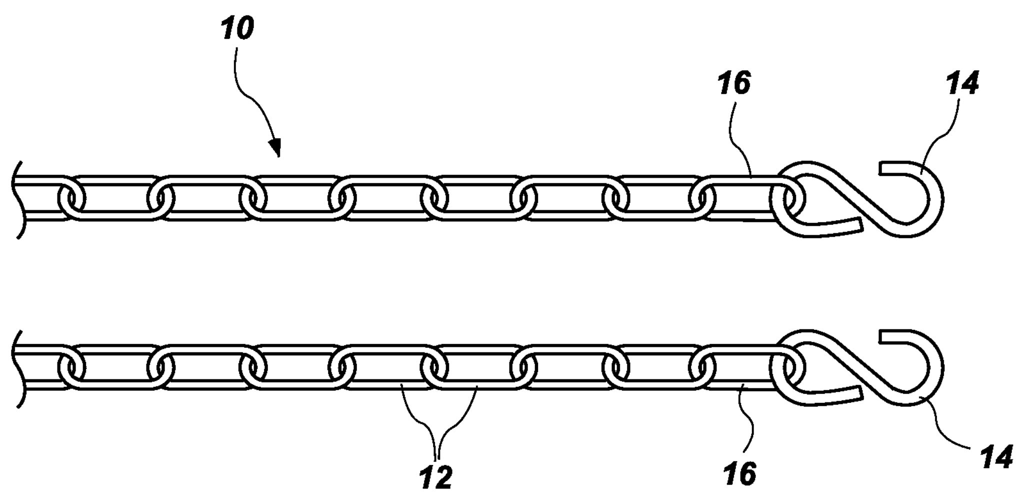
FIG. 2 illustrates the portion of chain assembly of FIG. 1 with the S-hook secured to the proximal link in the chain.

FIGS. 1 and 2 depict a chain 10 with a plurality of chain links 12. The chain 10 engages a hook or connector 14, such as an S-hook that is open ended. The proximal link 16 of the chain 10 may engage the connector. In some configurations, the proximal link 16 of the chain 10 engages the first end of an S-hook connector 14 and the S-hook may be stamped closed to prevent withdrawal of the chain 10 from the S-hook 14. While an S-hook is given by way of specific example, it will be appreciated that any type of conventional connector 14 may be used to connect the chain 10 to the anchor 18, and such are contemplated. For example, a threaded quick link, a coupling link, or any other conventional hook, link, and/or fastener may be used as connector 14.

Figure 3:
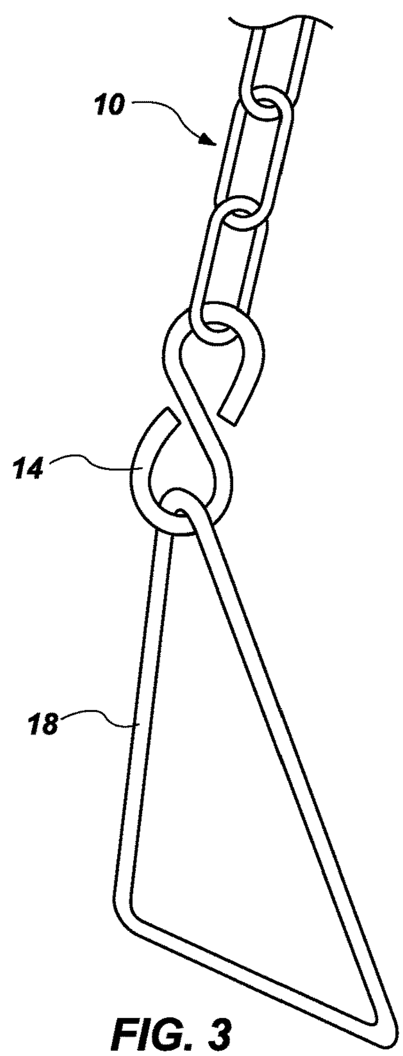
FIG. 3 illustrates a chain assembly with a triangular anchor engaged with the S-hook of FIG. 1.
Figure 4A:
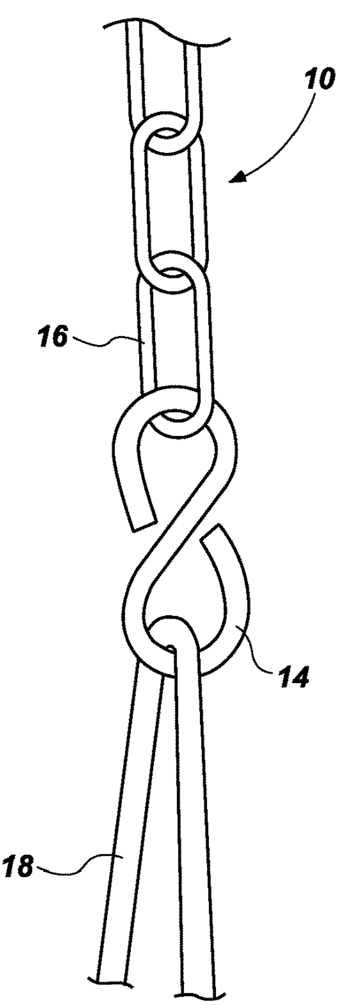
FIGS. 4A and 4B illustrate differing views of the chain assembly of FIG. 3 with the triangular anchor fixed to the S-hook.
Figure 4B:
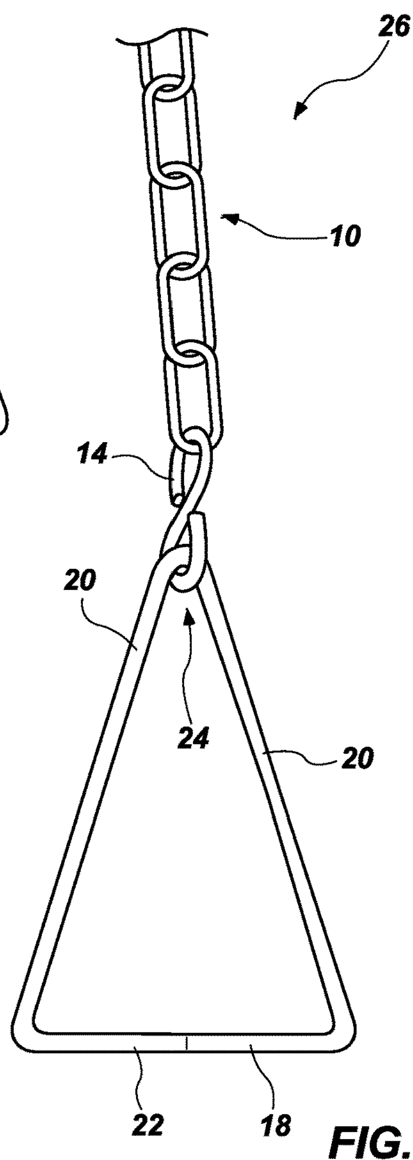

FIGS. 3 and 4A-B depict an anchor 18. The connector 14 may be used to secure the chain 10 to the anchor 18. In configurations using an S-hook as the connector 14, the S-hook may be secured to the chain 10 on one side of the S-book, and the opposite side of the S-hook may engage the anchor 18. The S-hook may be stamped to close one or both sides of the S-hook to prevent withdrawal of the anchor 18 from the S-hook. The chain 10, connector 14, and anchor 18 together may form a chain assembly 26 (FIG. 4B). In other configurations, the chain 10 may be directly connected to anchor 18 without an intervening connector 14.

The anchor 18 may be used to attach the finished chain assembly 26 to a piece of playground equipment, such as a swing. The anchor 18 may typically be triangular, which may be an isosceles and an acute triangle. However, it will be appreciated that other types of triangles such as an equilateral triangle may be utilized, and other shapes may also be suitable for the anchor 18 and are contemplated. The triangular anchor 18 may have two longer sides 20 which may be equal in length and a shorter side 22 that is not as long as the longer sides 20. The anchor 18 may be secured to the S-hook at a first angle 24 between the two longer sides 20.

The chain assembly 26 may be partially or entirely covered in a deformable polymer coating 30, such as a synthetic polymer plastic coating or other suitable coating. According to one configuration, the coating 30 may cover a portion of the chain 10, the entire connector 14, and the entire anchor 18. The coating 30 may also cover the junctions between the chain 10 and the connector 14 and the anchor 18 and the connector 14. In other words, a single contiguous coating 30 of synthetic plastic polymer may cover a portion of the chain 10, the entire connector 14, and the entire anchor 18. The single contiguous coating 30 may cover the junctions between the components of the chain assembly 26 such that there is no open space between the anchor-connector junction 38 and/or the chain-connector junction 40 (rather, any open space and/or gaps are covered by the deformable polymer coating 30). This lack of open space between the junctions in the chain assembly 26 may prevent a child's fingers and/or hair from being pulled, pinched, or otherwise injured by being caught in the junctions between the components of the chain assembly 26. Standard coated chains, while providing some protection and grip on the chain portion, do not cover the junctions in the chain assembly 26 between the chain 10 and the connector 14 and/or the connector 15 and the anchor 18.

Figure 6:
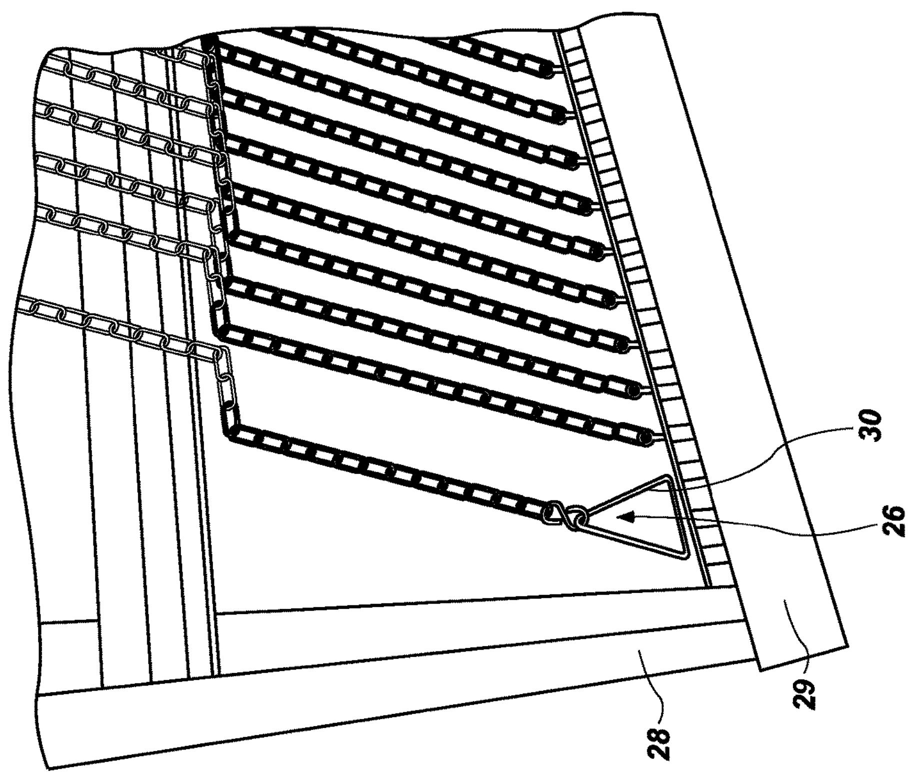
FIG. 6 illustrates the chain assembly of FIG. 3 secured to the dipping mechanism post coating.
Figure 5:
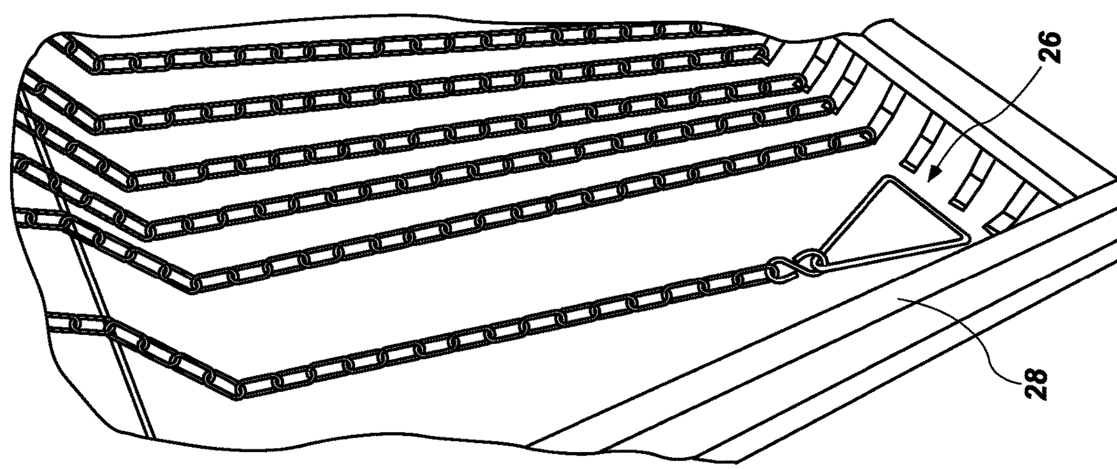
FIG. 5 illustrates the chain assembly of FIG. 3 secured to a dipping mechanism prior to coating.
Figure 7:
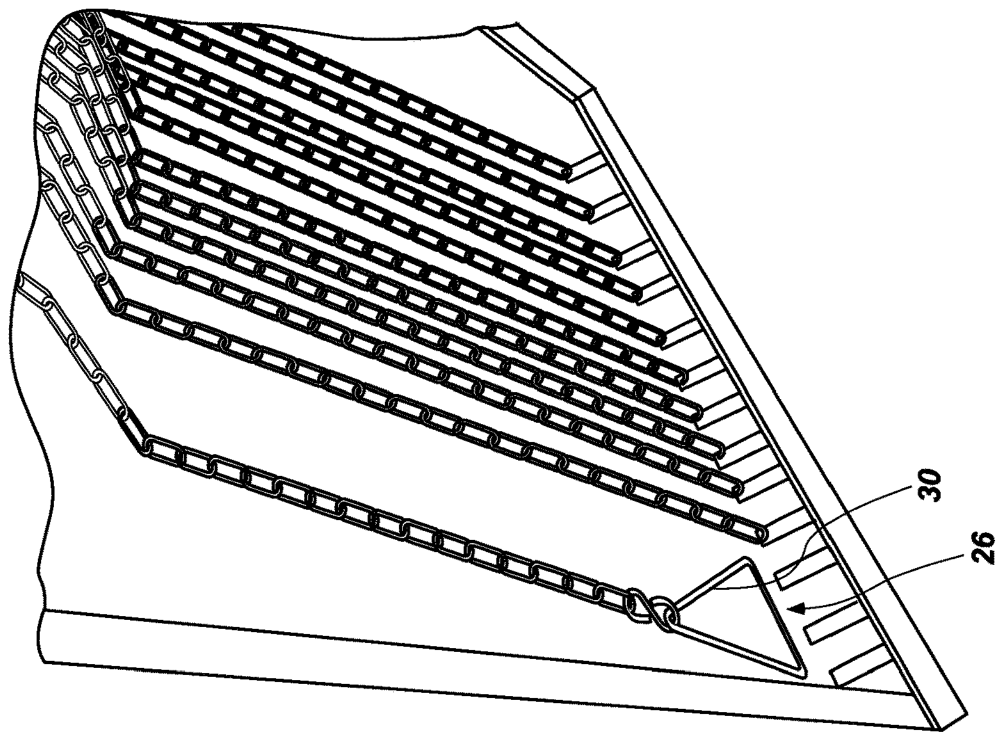
FIG. 7 illustrates the chain assembly of FIG. 3 secured to the dipping mechanism during drying.

Referring to FIGS. 5-7, the method of coating the chain assembly 26 is illustrated. A dip-coating method may be used. The chain assembly 26 may first be hung from a dipping mechanism 28. The chain assembly 26 may be hung with the anchor 18 at the bottom, then the connector 14 above the anchor 18, and the chain 10 above the connector. The chain assembly 26 may also be hung in other configurations and such are contemplated. The chain assembly 26 may be hung a predetermined length from the dipping mechanism 28. This predetermined length may be any suitable length, and may vary based on a particular use for the chain assembly. Typically the change in length of the chain assembly 26 is accomplished by varying the amount of chain 10 that is hung from the dipping mechanism 28. In some configurations, a typical predetermined length of chain 10 may be, for example, from about 30 centimeters to about 200 centimeters (from about 12 inches to about 80 inches). More specifically, the predetermined length may be between about 100 centimeters to about 150 centimeters (from about 40 inches to about 60 inches).

Once the chain assembly 26 is hung from the dipping mechanism 28 at the predetermined desired length, the dipping mechanism 28 may be lowered into a container 29 of liquid polymer coating, polymer gel, and/or a plastic coating solution. The polymer coating may comprise any suitable polymer coating, such as a plastisol or any other known synthetic polymer. After a predetermined period of time the dipping mechanism 28 may slowly lift the chain assembly 26 from the liquid polymer coating to avoid and/or reduce dripping. The chain assembly 26 is allowed to dry and cool such that a deformable polymer coating 30, rubber-like, hardens over the chain assembly 26 and is cool to the touch. A single dip of the chain assembly 26 may form a suitable coating 30, or multiple dips could be used to obtain a thicker coating as desired.

Figure 8B:
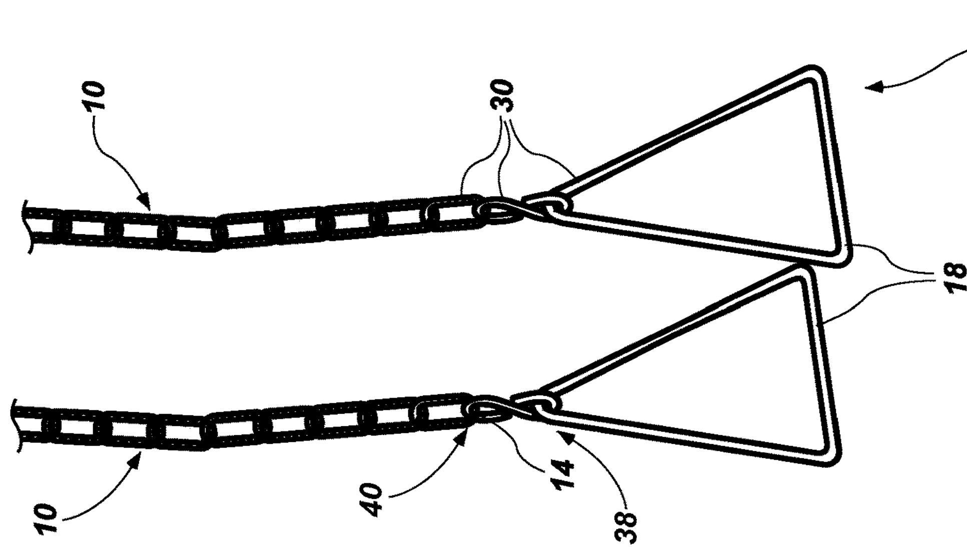
FIGS. 8A and 8B illustrate the chain assembly from differing views post-coating and drying.
Figure 8A:
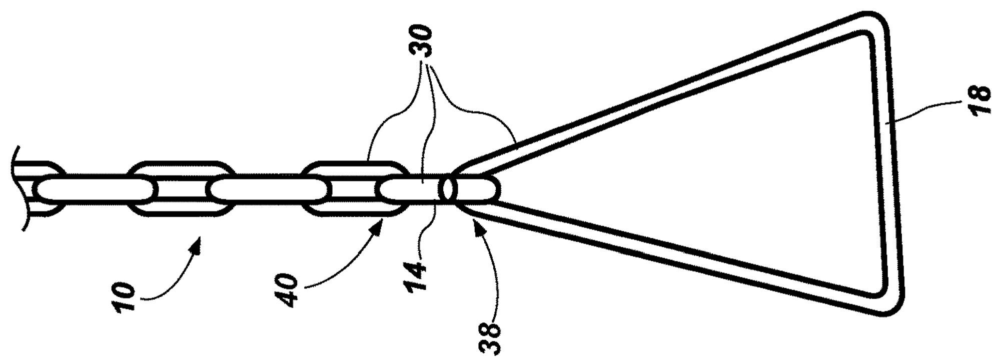

Referring to FIGS. 8A-B, the chain assembly 26 is coated at least partially and perhaps entirely with the deformable polymer coating 30. The deformable polymer coating 30 may allow movement, bending, manipulation, and some rotation of the separate components of the chain assembly 26 without breakage or tearing. For example, the polymer gel may create a single contiguous deformable polymer coating 30 that may cover the junctions between the connector 14, chain 10, and anchor 18 such that there is no open space between the anchor-connector junction 38 and/or the chain-connector junction 40. Some movement of the separate components at each junction may still be allowed by the deformable polymer coating 30.

Figure 9:
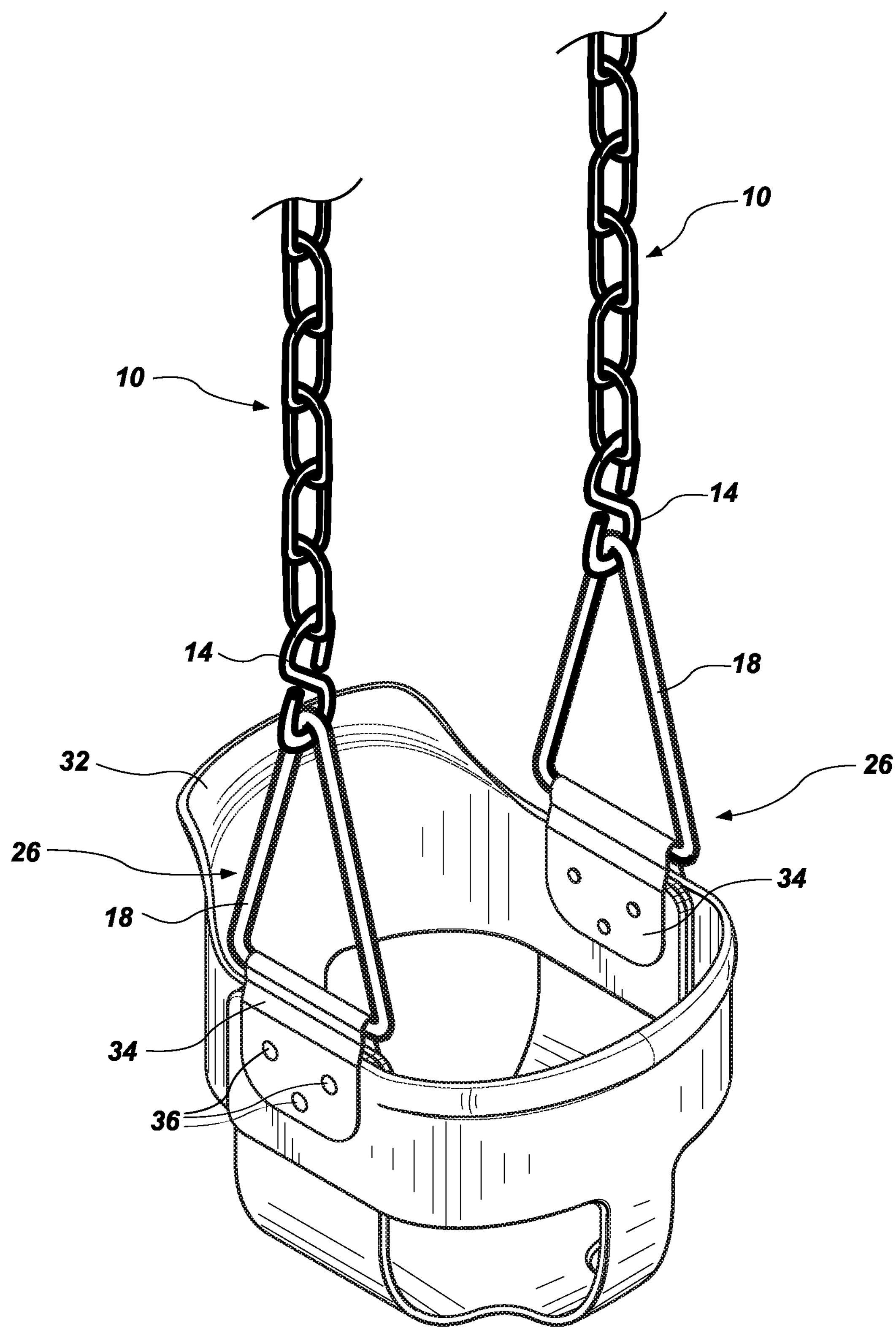
FIG. 9 illustrates the triangular anchor portion of the chain assembly of FIG. 3 secured to the seat.

After coating and drying, the chain assembly 26 may be attached to a piece of playground equipment by any suitable attachment means. Referring to FIG. 9, two chain assemblies 26 are secured to a swing seat 32 with brackets 34. The swing seat 32 may comprise at least two brackets 34 on opposite sides of the swing seat 32. Each bracket 34 may be configured to engage one chain assembly 26. Each bracket 34 may engage the respective shorter sides 22 of each of the triangle anchors 18 of the chain assembly 26. The brackets 34 may be secured to the swing seat 32 by rivets 36 or any other conventional fasteners. In some configurations, the bracket 34 may first be secured to the anchor 18, and the bracket 34 may be coated (fully or partially) with the chain assembly 26. In other configurations the bracket 34 need not be coated.

Figure 10:
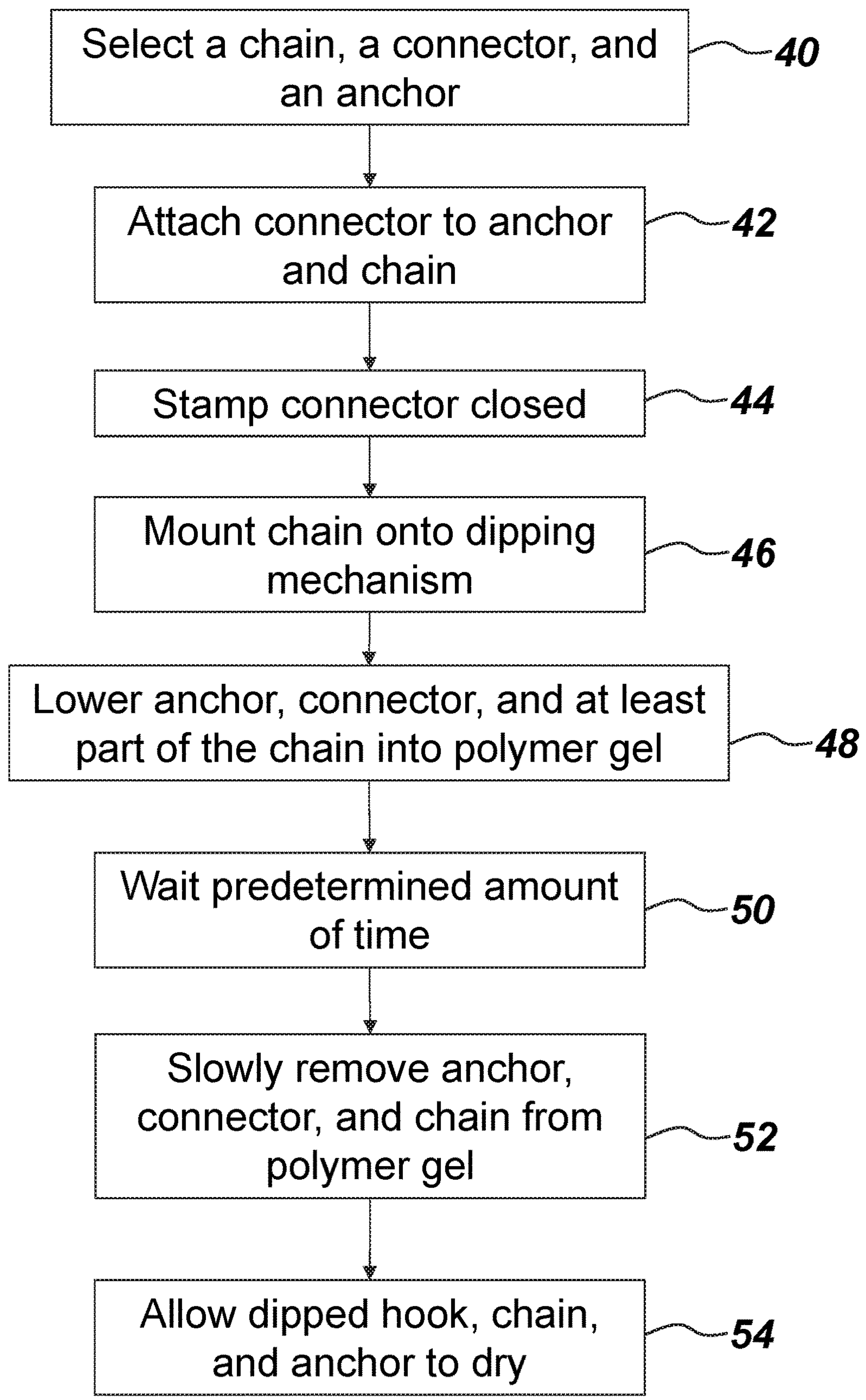
FIG. 10 shows a flow chart of a method according to the disclosure herein.

FIG. 10 shows a flow chart of steps that may be performed according to the method described herein to form a swing system having a chain assembly 26 with a deformable polymer coating 30. While FIG. 10 shows the steps as discrete steps and sets them forth in a particular order, the steps need not be performed in the particular order described, and more than one step may be performed at a time. In one configuration, the method may be performed in the specific order set forth in FIG. 10. First, a chain 10, connector 14, and anchor 18 may be selected (40). Next, the connector 14 may attached to the chain 10 and the anchor 18 (42). For configurations with an S-hook type connector, the first side of the S-hook may be attached to the chain 10 and the second side of the S-hook may be attached to the anchor 18. An optional step may be to secure the connector 14 closed, such as by stamping the connector closed (44).

Next, the chain assembly 26 may be mounted onto the dipping mechanism 28, such as by attaching the chain 10 to the mount of the dipping mechanism (46). Next, the chain assembly 26 may be lowered into the polymer gel (48). For configurations where the chain assembly 26 is mounted in the specific manner shown in FIGS. 5-7, with the anchor 18 at the lowest point, followed by the connector 14 and chain 10, the anchor 18, connector 14, and at least part of the chain 10 may be lowered into the polymer gel. In other configurations, the chain assembly 26 may be mounted in a different position and/or order. For example, the entire chain 10, connector 14, and at least part of the anchor 18 may lowered into the polymer gel. Many variations for mounting the chain assembly are possible and contemplated herein. Whether the chain 10 is first lowered into the polymer gel or the anchor 18 is first lowered into the polymer gel, it may still create a single contiguous deformable polymer coating 30 that may cover the junctions between the individual components of the chain assembly (i.e., chain 10, anchor 18, and/or connector 14) such that there is no open space between the anchor-connector junction 38 and/or the chain-connector junction 40 (rather, any open space and/or gaps are covered by the deformable polymer coating 30).

The chain assembly 26 may be comprised of typically known metals or metal alloys as well as other known materials such as polymers or carbon fiber, or combinations thereof. Likewise the brackets 34 may be comprised of known metals or metal alloys. The swing 32 seat may be comprised of any of a plurality of materials including, but not limited to, wood, polymers, rubber, metal, metal alloys, carbon fiber, polymer rubber, plastic, polypropylene copolymer, synthetic rubber, ethylene-propylene-diene-monomer (EPDM), etc. In one specific configuration, the swing seat is formed of 5/16" thick EPDM rubber which is known to be resistant to cracking, oxidizing, and crazing.

Although the foregoing disclosure provides many specifics, such as use of the chain assembly in conjunction with swings, it will be appreciated that the assembly may have use outside of swings. For example, it may have applications where coated chains and chain assemblies may provide additional safety and easier gripping, while allowing for continued manipulation of the chain or chain assembly, and such applications are contemplated. The disclosure may have application, for example, on other types of playground equipment, particularly items which are suspended by a chain, such as tire swings, swing seats, web/saucer swings, climbing ropes, platform swings, and other types of playground equipment using a chain. The particular use described with a child's bucket swing should not be construed as limiting the scope of any of the ensuing claims. Other embodiments and configurations may be devised which do not depart from the scopes of the claims. Features from different embodiments and configurations may be employed separately or in combination. Accordingly, all additions, deletions and modifications to the disclosed subject matter that fall within the scopes of the claims are to be embraced thereby. The scope of each claim is indicated and limited only by its plain language and the full scope of available legal equivalents to its elements.

The various embodiments described above, including elements of the various embodiments described above, can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

What is claimed:

1. A swing system comprising:

a swing chain assembly comprising:

a chain comprising a plurality of links secured to a connector;

an anchor secured to the connector;

an anchor-connector junction; and a chain-connector junction;

each of the chain, the connector, and the anchor at least partially covered with a single deformable polymer and each of the anchor-connector junction and chain-connector junction entirely covered with the single deformable polymer closing any open space between each junction.

2. The swing system of claim 1, comprising:

a seat having a first side and a second side opposite the first side; and a first bracket secured to the first side of the seat and a second bracket secured to the second side of the seat.

3. The swing system of claim 2, wherein the system further comprises a second swing chain assembly, the anchor of the swing chain assembly secured to the first bracket and the anchor of the second swing chain assembly secured to the second bracket.

4. The swing system of claim 1, wherein the connector comprises an S-shaped hook, and wherein the plurality of links of the chain comprises a proximal link, the proximal link of the chain secured to a first side of the S-shaped hook and the anchor secured to a second end of the S-shaped hook.

5. The swing system of claim 1, wherein the anchor comprises an isosceles triangle.

6. The swing system of claim 1, wherein the swing chain assembly is entirely covered with the deformable polymer.

7. The swing system of claim 1, wherein the anchor and the connector are entirely covered with the deformable polymer and a portion of the chain are covered with the deformable polymer.

8. The swing system of claim 1, wherein the chain secured to the connector defines a chain-connector junction, and wherein the anchor secured to the connector defines an anchor-connector junction, the deformable polymer surrounding the chain-connector junction and the anchor-connector junction.

9. The swing system of claim 1, wherein the chain, the connector and the anchor are surrounded by a contiguous coating of synthetic plastic polymer.

10. A swing system comprising:

a swing chain assembly comprising:

a chain comprising a plurality of links, including a proximal link;

an anchor;

a connector secured to the proximal link and the anchor;

an anchor-connector junction;

a chain-connector junction, and a contiguous coating of synthetic plastic polymer covering at least a portion of the chain, the entire connector, the entire anchor, and each of the anchor-connector junction and chain-connector junction.

11. The swing system of claim 10, wherein the connector secured to the proximal link defines a chain-connector junction, and wherein the connector secured to the anchor defines an anchor-connector junction, the contiguous coating of synthetic plastic polymer surrounding the chain-connector junction and the anchor-connector junction.

12. The swing system of claim 10, wherein the chain, the anchor, and the connector comprise a swing chain assembly.

13. The swing system of claim 12, wherein the swing system further comprises a bracket attachable to the anchor and a swing seat.

14. The swing system of claim 13, wherein the anchor comprises an isosceles triangle.

15. A method of making a swing system comprising:

selecting a chain comprising a plurality of links extending from a proximal end to a distal end;

selecting a connector;

selecting an anchor;

attaching the connector to the chain at a chain-connector junction, attaching the connector to the anchor at a chain-connector junction, the chain, connector, and anchor forming a swing chain assembly; and dipping the swing chain assembly at least partially into a polymer gel, coating the swing chain assembly, including the chain-connector junction and the anchor-connector junction closing any space between each junction, in a single contiguous coating.

16. The method of claim 15, further comprising the step of mounting the swing chain assembly onto a dipping mechanism by attaching the distal end of the chain to the dipping mechanism, the proximal end of the chain attached to the connector.

17. The method of claim 15, wherein the step of dipping the swing chain assembly at least partially into the polymer gel comprises dipping the anchor of the swing chain assembly first, followed by the connector and at least a portion of the chain.

18. The method of claim 15, wherein the step of dipping the swing chain assembly at least partially into the polymer gel comprises dipping the anchor, the connector, and at least part of the chain.

19. The method of claim 15, wherein the connector comprises an S-hook having a first side and a second side, the step of attaching the connector to the chain comprising attaching the proximal end of the chain to the first side of the S-hook and stamping the first side of the S-hook closed.

20. The method of claim 19, wherein the step of attaching the connector to the anchor comprises attaching the anchor to the second side of the S-hook and stamping the second side of the S-hook closed.

* * * * *